(12) United States Patent
Walling et al.

(10) Patent No.: US 7,376,491 B2
(45) Date of Patent: May 20, 2008

(54) DETECTION OF ISLANDING IN POWER GRIDS

(75) Inventors: Reigh Allen Walling, Clifton Park, NY (US); Andre Langel, Münster (DE)

(73) Assignee: General Electric Company, Schenectady, NY (US)

(*) Notice: Subject to any disclaimer, the term of this patent is extended or adjusted under 35 U.S.C. 154(b) by 238 days.

(21) Appl. No.: 11/259,673

(22) Filed: Oct. 26, 2005

(65) Prior Publication Data

US 2007/0093978 A1    Apr. 26, 2007

(51) Int. Cl.
    *G05D 11/00*    (2006.01)
(52) U.S. Cl. ..................... 700/292; 700/286
(58) Field of Classification Search ........... 700/286, 700/287, 292, 293; 702/71, 72, 73
    See application file for complete search history.

(56) References Cited

U.S. PATENT DOCUMENTS

| | | | |
|---|---|---|---|
| 5,369,353 A | 11/1994 | Erdman | |
| 5,686,766 A | 11/1997 | Tamechika | |
| 6,172,889 B1 | 1/2001 | Eguchi et al. | |
| 6,219,623 B1 | 4/2001 | Wills | |
| 6,603,290 B2 * | 8/2003 | Hochgraf | 322/37 |
| 6,642,700 B2 * | 11/2003 | Slade et al. | 324/66 |
| 6,801,442 B2 * | 10/2004 | Suzui et al. | 363/55 |
| 6,810,339 B2 | 10/2004 | Wills | |
| 6,815,932 B2 | 11/2004 | Wall | |
| 6,853,940 B2 | 2/2005 | Tuladhar | |
| 6,864,595 B2 | 3/2005 | Wall | |
| 7,016,793 B2 | 3/2006 | Ye et al. | |
| 7,233,129 B2 * | 6/2007 | Erdman et al. | 322/17 |
| 2003/0227172 A1 * | 12/2003 | Erdman et al. | 290/44 |
| 2004/0010350 A1 * | 1/2004 | Lof et al. | 700/292 |

OTHER PUBLICATIONS

Tunlasakkun et al.; "MCS51—Based Islanding Detection for Mini Grid Connected Inverter in Renewable Energy"; THe joint Internation Conference on Sustainable Energy and Environment(SEE); Dec. 2004, pp. 73-76.*

(Continued)

*Primary Examiner*—Leo Picard
*Assistant Examiner*—Chad Rapp
(74) *Attorney, Agent, or Firm*—Armstrong Teasdale LLP

(57) ABSTRACT

A method for detecting islanding conditions in an electrical grid having a power line voltage includes monitoring a detectable signal different from the power line voltage at a generating station, superimposing the detectable signal onto the power line voltage at a grid point outside the generating station, and switching the generating station from a grid-connected mode of operation to an islanded mode of operation when the signal to which the detector is responsive is determined to be absent.

20 Claims, 5 Drawing Sheets

OTHER PUBLICATIONS

Motohashi et al.; "Equivalent Transformation Technique for Islanding Detection Methods of Synchronous Generators: Reactive Power Perturbation Methods Using AVR of SVC" Electrical Engineering in Japan, vol. 131 No. 4; 2000; pp. 29-37.*

Tsukamoto et al.; "Study on Islanding on Dispersed Photovoltaic Power Systems Connected to a Utility Power Grid"; Solar Energy; Elsevier vol. 70 No. 6 2001; pp. 505-511.*

Funabashi et al.; "A Review of Islanding Detection Methods for Distributed Resources"; 2003 IEEE Bologna Power Tech Conference pp. 1-6.*

Kim et al.; "Islanding Detection Method of Distributed Units Connected to Power Distribution System"; 2000; IEEE pp. 643-647.*

Bower et al; "Evaluation of Islanding Detection Methods for Photovoltaic Utility0Interactive Power Systems"; Mar. 2002, Sandia for DOE; Task V Report IEA_PVPS T5-09:2002.*

* cited by examiner

DETECTION OF ISLANDING IN POWER GRIDS

BACKGROUND OF THE INVENTION

This invention relates generally to power generation and more specifically to methods and apparatus for detecting islanding of a power generation facility connected to a grid. The methods and apparatus are particularly applicable to wind farms, but are not necessarily limited thereto.

An open circuit, such as caused by opening of a switch, circuit breaker, or fuse, in a radial connection between a windfarm and a grid power network, can leave the windfarm isolated from the grid. This isolation is called "islanded operation," and is forbidden in several grid codes. Similarly, the opening of a circuit breaker or switch at a windfarm substation, resulting in isolation of a collector circuit from the substation, islands the wind turbine on that collector circuit from the substation and from the grid. Although the windfarm is isolated from grid, it might still be connected to consumers outside of the wind farm. Islanding can result in severe stress on equipment, including high voltages and can be dangerous to maintenance personnel. Avoidance of severe equipment stress can require very fast detection of the islanded condition.

U.S. Pat. No. 6,810,339 B2 describes some known methods for eliminating the islanding problem. These include passive methods such as under or overvoltage, and under and over frequency shutdown trips of converter equipment if voltage or frequency exceed certain predefined limits. Additional schemes use "unstable frequency" or "active frequency drift, or changing the real or reactive power output of a converter. A method said to be superior to these is disclosed in which a converter detects a change of frequency, up or down, and causes an accelerated frequency shift in the same direction to quickly trip an under/over frequency limit.

U.S. Pat. No. 6,815,932 B2 describes a method for controlling a generator system connected to an electric power system so as to avoid the unintentional islanding of the generator. The method uses a combination of frequency characteristic thresholds and an active phase angle destabilization technique to destabilize well or perfectly matched islands.

Nevertheless, reliable detection of islanding by passive observation of voltage, current, frequency, and/or phase angle change has proven difficult. These detection methods are often incapable of very fast detection, are susceptible to false operation caused by grid events, and can be confounded by balanced or near-balance between power generated by the windfarm and the power demand within the area of the grid that is islanded with the windfarm. Detection by monitoring switch status is complicated, requiring an expensive communication system. Often the status of multiple switching devices is needed, along with logic to account for multiple paths of interconnection.

BRIEF DESCRIPTION OF THE INVENTION

In one aspect of the present invention, there is provided a method for detecting islanding conditions in an electrical grid having a power line voltage. The method includes monitoring a detectable signal different from the power line voltage at a generating station, superimposing the detectable signal onto the power line voltage at a grid point outside the generating station, and switching the generating station from a grid-connected mode of operation to an islanded mode of operation when the signal to which the detector is responsive is determined to be absent.

In another aspect of the present invention, there is provided an apparatus for detecting islanding conditions in a power grid having a power line voltage. The apparatus includes a detector configured to monitor a detectable signal different from the power line voltage at a generating station, a signal generator configured to superimpose the detectable signal onto the power line voltage at a grid point outside the monitoring generating station, and a switch configured to switch the generating unit from a grid-connected mode of operation to an islanded mode of operation when the signal to which the detector is responsive is determined to be absent.

In yet another aspect of the present invention, a generating station is provided that includes at least one generating unit electrically coupled to a power grid, a detector responsive to a signal electrically coupled from the power grid to the generating unit, and a switch responsive to the detector to switch the generating unit from a grid-connected mode of operation to an islanded mode of operation when the signal to which the detector is responsive is determined to be absent.

It will be appreciated that configurations of the present invention provide fast and reliable detection of islanding conditions of generators, including individual wind turbine generators in windfarms.

DETAILED DESCRIPTION OF THE INVENTION

In some configurations of the present invention, islanding of a generator station from the electric power grid is detected using a signal superimposed onto the power frequency voltage at a suitable point. In the case of the generator station being a windfarm, this signal is continuously (or nearly continuously) monitored at each wind turbine. Absence of the monitored signal implies that the wind turbine is electrically isolated from the signal injection point, which can be interpreted as evidence of islanding. The wind turbine generator can be tripped in response, or the control mode of the generator can be changed from a mode appropriate for grid-connected operation (e.g., current source control) to a mode appropriate for isolated (i.e., islanded) operation (e.g., fixed-frequency voltage source control).

The frequency and characteristics of the injected signal are chosen such that the detection of the islanding can be fast, reliable, and secure, without interfering with power quality or other communication systems. In many configurations, it differs sufficiently from the transient and harmonic voltages and/or currents generated within a windfarm to avoid falsely detecting a connected condition when islanding has occurred. Security is favored by injecting two frequencies, simultaneously, neither of which is at an integer multiple of the power frequency.

In some configurations of the present invention, the signal is monitored at the low voltage level to which the wind turbine is connected. The signal would normally be connected at either the medium voltage collector bus or in the high-voltage transmission system. In such configurations, the system is configured so that the signal propagates through high voltage and medium voltage transformers without excessive attenuation. In some configurations, the signal is monitored on the medium voltage side of the wind turbine step-up transformers, using capacitive couplers or voltage transformers.

Figure 1:
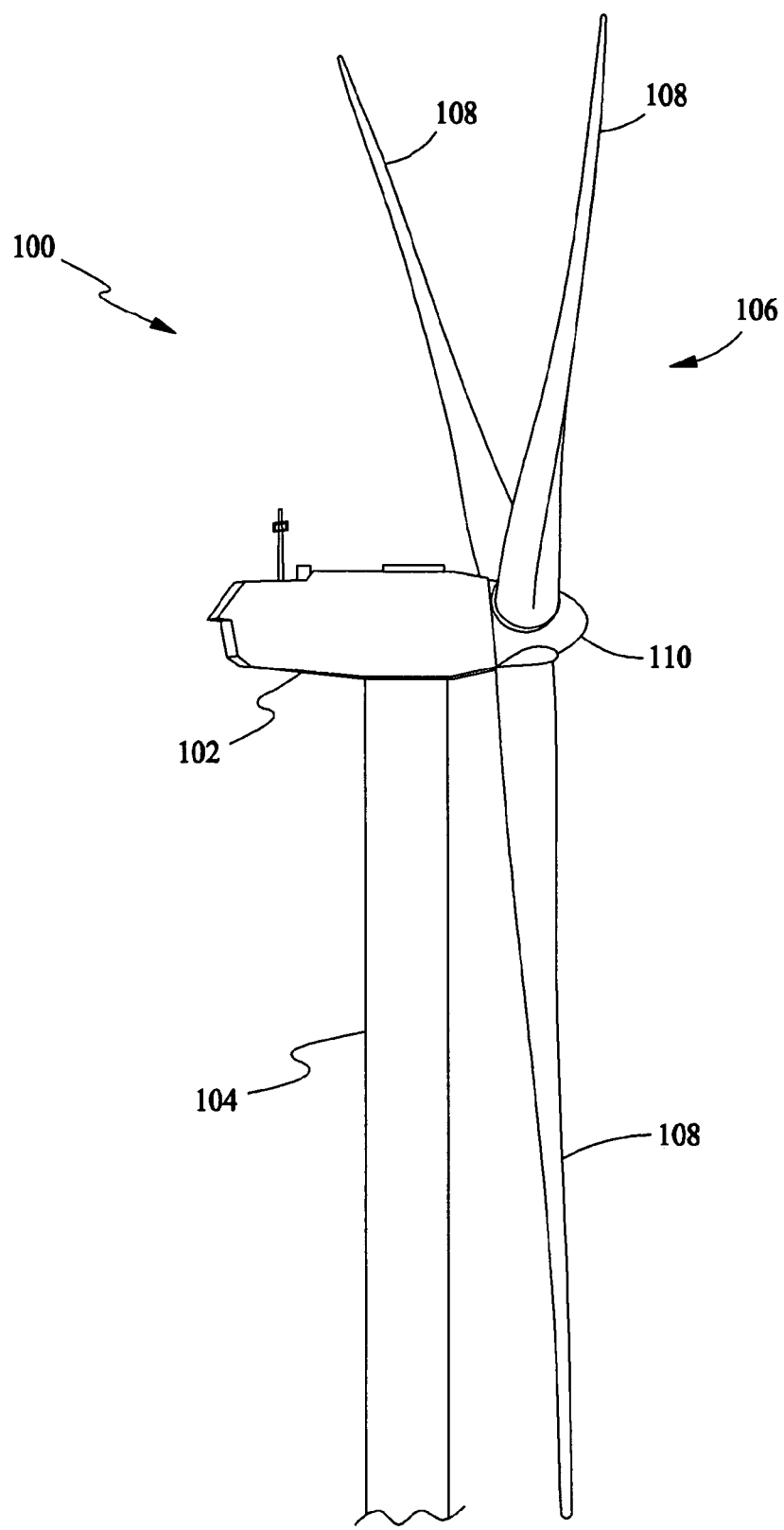
FIG. 1 is a drawing of an exemplary configuration of a wind turbine.

In some configurations and referring to FIG. 1, a wind turbine 100 comprises a nacelle 102 housing a generator (not shown in FIG. 1). Nacelle 102 is mounted atop a tall tower 104, only a portion of which is shown in FIG. 1. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present invention.

Figure 2:
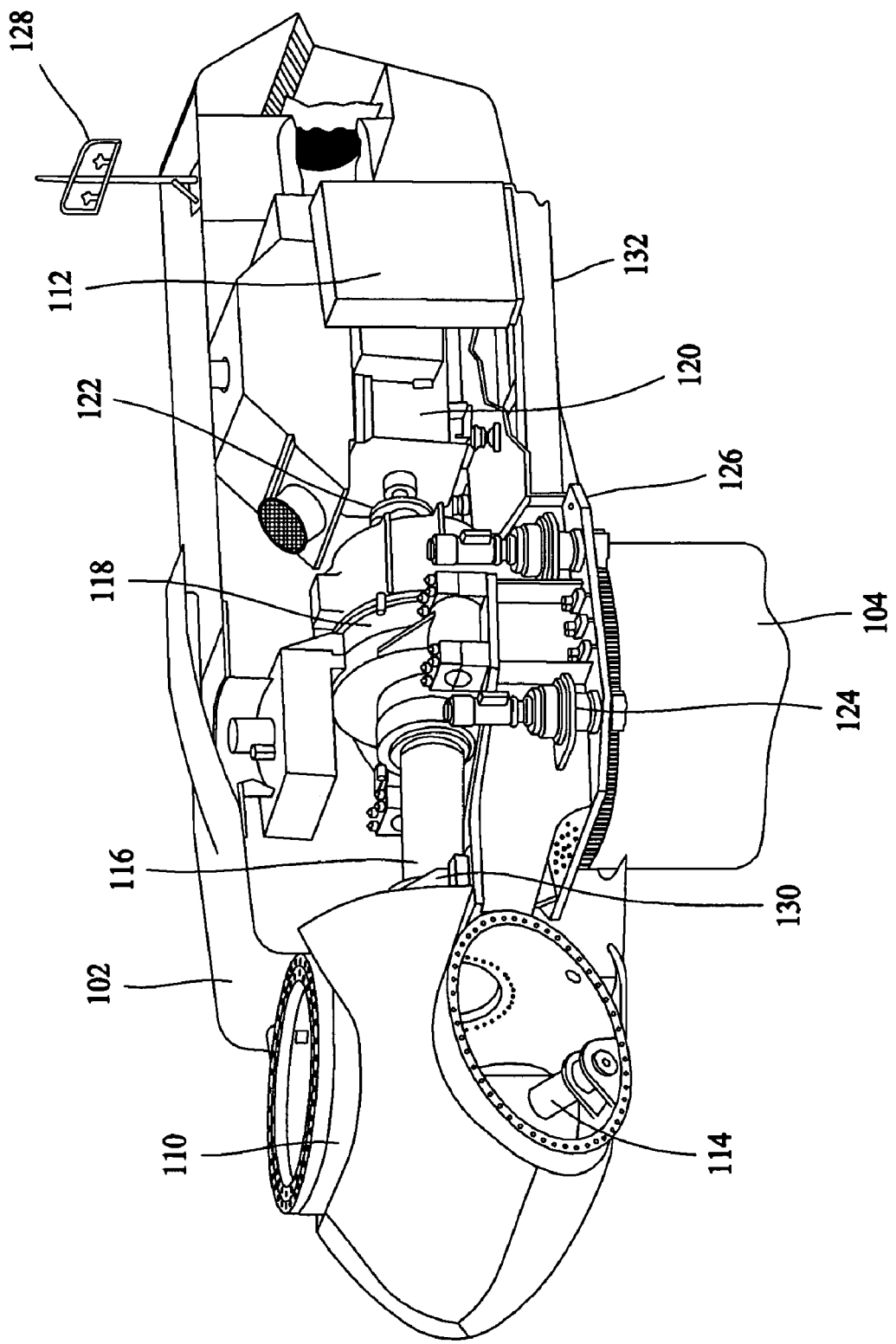
FIG. 2 is a cut-away perspective view of a nacelle of the exemplary wind turbine configuration shown in FIG. 1.

In some configurations and referring to FIG. 2, various components are housed in nacelle 102 atop tower 104 of wind turbine 100. The height of tower 104 is selected based upon factors and conditions known in the art. In some configurations, one or more microcontrollers within control panel 112 comprise a control system used for overall system monitoring and control. Alternative distributed or centralized control architectures are used in some configurations.

In some configurations, a variable blade pitch drive 114 is provided to control the pitch of blades 108 (not shown in FIG. 2) that drive hub 110 as a result of wind. In some configurations, the pitches of blades 108 are individually controlled by blade pitch drive 114. Hub 110 and blades 108 together comprise wind turbine rotor 106.

The drive train of the wind turbine includes a main rotor shaft 116 (also referred to as a "low speed shaft") connected to hub 110 via main bearing 130 and (in some configurations), at an opposite end of shaft 116 to a gear box 118. Gear box 118 drives a high speed shaft of generator 120. In other configurations, main rotor shaft 116 is coupled directly to generator 120. The high speed shaft (not identified in FIG. 2) is used to drive generator 120, which is mounted on main frame 132. In some configurations, rotor torque is transmitted via coupling 122. In configurations of the present invention, generator 120 is a direct drive permanent magnet generator.

Yaw drive 124 and yaw deck 126 provide a yaw orientation system for wind turbine 100. A meteorological boom 128 provides information for a turbine control system (which may be located in control panel 112). This information may include wind direction and/or wind speed. In some configurations, the yaw system is mounted on a flange provided atop tower 104.

Figure 3:
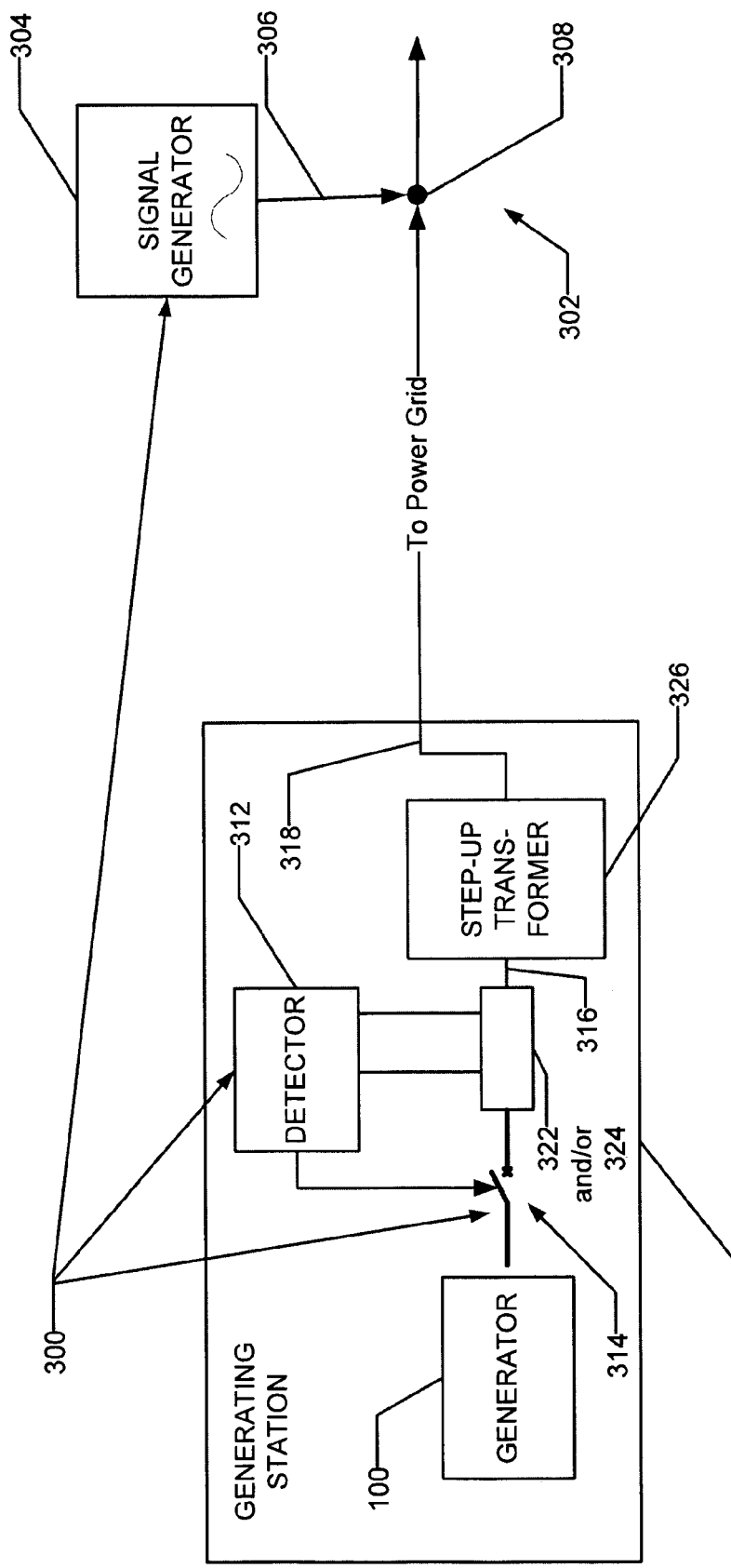
FIG. 3 is a block diagram of a configuration of an anti-islanding system installed on a generator station.

Referring to FIG. 3, some configurations of the present invention provide an apparatus 300 for detecting islanding conditions in a power grid 302 having a power line voltage. Apparatus 300 includes a signal generator 304 configured to superimpose a detectable signal 306 different from power line voltage onto the power line voltage at a grid point 308 outside a generating station 310. (The point at which detectable signal 306 is superimposed may, for example, be a generating station different from generating station 310, or any other suitable grid point.) Also included in apparatus 300 is a detector or monitor 312 that is configured to monitor detectable signal 306 at generating station 310. In addition, a switch 314 is provided that is configured to trip generating station 310 or a portion thereof (such as a single wind turbine 100 or a plurality of wind turbines 100) when detector 312 determines that the monitored detectable signal is absent. More generally, the control mode of generating station 310 is shifted from a mode appropriate for grid-connected operation (e.g., current source control) to a mode appropriate for isolated (i.e., islanded) operation (e.g., fixed-frequency voltage source control).

In some configurations, detectable signal 306 differs from transient and harmonic voltages and/or currents that may be generated by generating station 310 or that are otherwise present in power grid 302. Detectable signal 306 comprises one, or in some configurations, at least two simultaneous frequencies that are not an integer multiple of the power line voltage frequency. In some configurations, detector or monitor 312 is further configured to monitor detectable signal 306 at a low voltage level at which generator 304 is connected. Also, in various configurations of the present invention, generator 304 is further configured to inject the detectable signal at either a medium voltage collector bus 316 or in a high-voltage transmission system 318.

Figure 4:
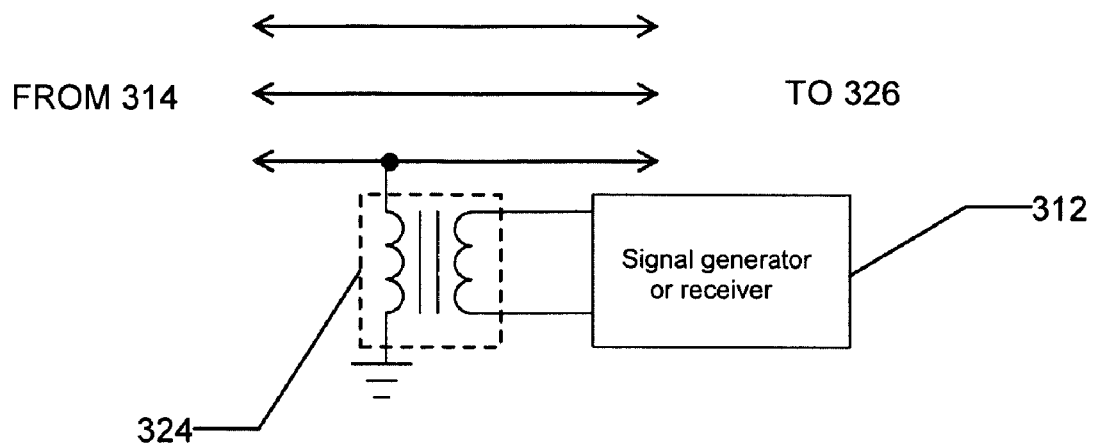
FIG. 4 is a partial schematic diagram of a configuration of transformer phase to ground coupling of a signal generator (or a signal receiver) suitable for the configuration illustrated in FIG. 3. Although the examples in FIGS. 4, 5, and 6 show coupling to only one phase (or one combination of phases), the signal may also be coupled to two or more phases (e.g., all three phases in a three-phase system).
Figure 5:
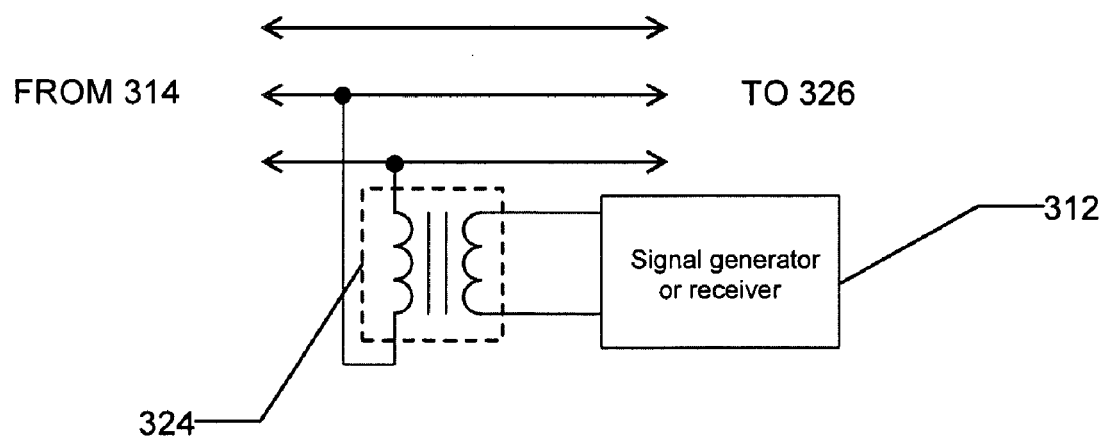
FIG. 5 is a partial schematic diagram of a configuration of transformer phase to phase coupling of a signal generator (or a signal receiver) suitable for the configuration illustrated in FIG. 3.
Figure 6:
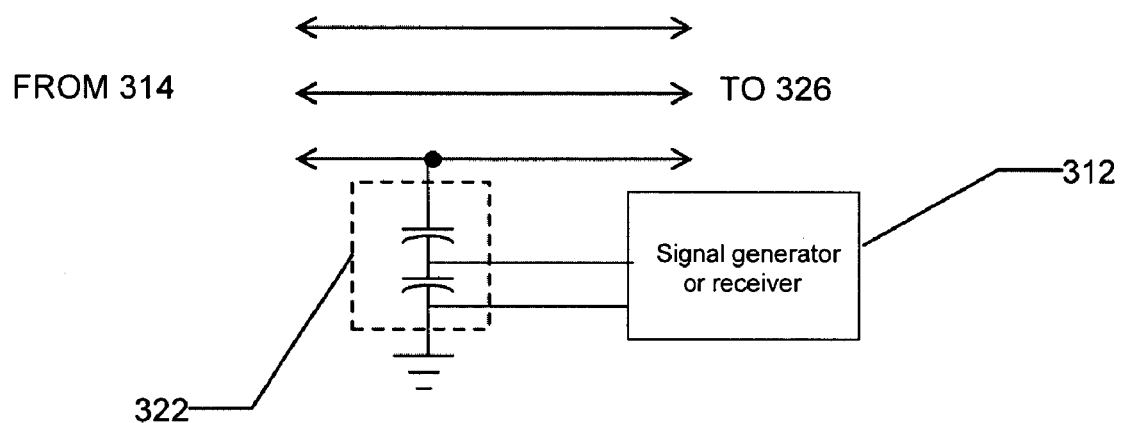
FIG. 6 is a partial schematic diagram of a configuration of a capacitive phase to ground coupling of a signal generator (or a signal receiver) suitable for the configuration illustrated in FIG. 3.

Generating station 310 can be, but need not necessarily be, a windfarm comprising a plurality of wind turbines 100 that generate electrical power, and detector 312 can be further configured to monitor detectable signal 306 at a low voltage level at which a wind turbine 100 of a windfarm is connected. In some configurations, detector 312 further comprises either (or both) a capacitive coupler 322 or a voltage transformer 324 electrically coupled to medium voltage side 316 of a wind turbine step-up transformer 326. Examples of transformer 324 and capacitive 322 couplings are shown in FIGS. 4, 5, and 6 for a three phase system. Essentially similar coupling types can be used to inject a signal from a transmitter. Also, in some configurations, generating station 310 can be a single generator, such as a single wind turbine 100, a single electrical generating unit of another type, or a plurality of generating units of which all, some portion, or none are wind turbines. Thus, generating station 310 can be, in various configurations, a single generator or generating unit, or a plurality of generators or generating units (which may be dispersed), and the type of generator or generating unit (or generators or generating units) need not be wind turbines, and need not even be identical to one another. Thus, configurations of the invention are also more generally applicable to "power parks," and are not restricted to particular types of power parks, such as wind farms or solar power farms.

In some configurations of the present invention and referring to FIGS. 1, 2 and 3, a generation station is provided, such as wind turbine 100. Generating station (e.g., wind turbine 100) is electrically coupled to a power grid 302, and is provided with a detector 312 responsive to a signal 306 electrically coupled from power grid 302 to generator, and a switch 314 responsive to detector 312 to trip (take offline) wind turbine generator 120 when signal 306 to which detector is responsive is determined to be absent. Signal 306, in some configurations, differs from generated transient and harmonic voltages and/or currents and can comprise one frequency, or at least two simultaneous frequencies that are not integer multiple(s) of the power line voltage frequency.

A method for detecting islanding conditions in an electrical power grid 302 having a power line voltage thus includes superimposing a detectable signal 306 different from the power line voltage onto the power line voltage at a grid point 308 outside generating station 310, monitoring detectable signal 306 at generating station 310, and tripping generating station 310 or a portion thereof (e.g., a wind turbine 100) when the monitored detectable signal is determined to be absent. In some configurations, detectable signal 306 differs from generated transient and harmonic voltages and/or currents, and/or comprises one, or in some configurations, at least two simultaneous frequencies that are not an integer multiple of power line voltage frequency. Monitoring detectable signal 306 in some configurations further comprises monitoring detectable signal 306 at a low voltage level at which generator 310 is connected. Superimposing detectable signal 306 further comprises, in some configurations, injecting detectable signal 306 at either a medium voltage collector bus 316 or in a high-voltage transmission system 318. Generating station 310 is, in some configurations, a windfarm comprising a plurality of wind turbines 100. Monitoring the detectable signal can comprise using either or both a capacitive coupler 322 or a voltage transformer 324 to monitor a medium voltage side 316 of a wind turbine step-up transformer 326.

It will thus be appreciated that reliable detection of islanding is provided by various configurations of the present invention. Detection methods and apparatus configurations of the present invention provide very fast detection that avoids false operation caused by grid events, and that is not confounded by balanced or near-balance between power generated by (for example) a windfarm and the power demand within the area of the grid that is islanded with the windfarm. Detection by monitoring switch status is not required, nor is an expensive communication system.

While the invention has been described in terms of various specific embodiments, those skilled in the art will recognize that the invention can be practiced with modification within the spirit and scope of the claims.

What is claimed is:

1. A method for detecting islanding conditions in an electrical grid having a power line voltage, said method comprising:
   continuously monitoring a detectable signal different from the power line voltage at a generating station, wherein the generating station includes at least one wind turbine;
   superimposing the detectable signal onto the power line voltage at a grid point outside the generating station; and
   switching said generating station from a grid-connected mode of operation to an islanded mode of operation when the detectable signal to which a detector is responsive is determined to be absent.

2. A method in accordance with claim 1 wherein the detectable signal differs from generated transient and harmonic voltages, currents or both.

3. A method in accordance with claim 1 wherein the detectable signal comprises at least two simultaneous frequencies that are not integer multiples of power line voltage frequency.

4. A method in accordance with claim 1 wherein said monitoring the detectable signal further comprises monitoring the detectable signal at a low voltage level at which the generating station is connected.

5. A method in accordance with claim 4 wherein said superimposing the detectable signal further comprises injecting the detectable signal at either a medium voltage collector bus or in a high-voltage transmission system.

6. A method in accordance with claim 1 wherein the generating station is a windfarm and the detectable signal differs from generated transient and harmonic voltages, currents, or both.

7. A method in accordance with claim 6 wherein said monitoring the detectable signal further comprises monitoring the detectable signal at a low voltage level at which a wind turbine of the windfarm is connected.

8. A method in accordance with claim 7 wherein said superimposing the detectable signal further comprises injecting the detectable signal at either a medium voltage collector bus or in a high-voltage transmission system.

9. A method in accordance with claim 6 wherein said monitoring the detectable signal comprises using at least one of a capacitive coupler or a voltage transformer to monitor a medium voltage side of a wind turbine step-up transformer.

10. A method in accordance with claim 6 wherein the detectable signal comprises at least two simultaneous frequencies that are not integer multiples of power line voltage frequency.

11. An apparatus for detecting islanding conditions in a power grid having a power line voltage, said apparatus comprising:
    a detector configured to continuously monitor a detectable signal different from the power line voltage at a generating station, wherein the generating station includes at least one wind turbine, and wherein the detector includes at least one of a capacitive coupler and a voltage transformer;
    a signal generator configured to superimpose the detectable signal onto the power line voltage at a grid point outside the monitoring generating station; and
    a switch configured to switch said generating station from a grid-connected mode of operation to an islanded mode of operation when the detectable signal to which said detector is responsive is determined to be absent.

12. An apparatus in accordance with claim 11 wherein the detectable signal differs from generated transient and harmonic voltages, currents, or both.

13. An apparatus in accordance with claim 11 wherein the detectable signal comprises at least two simultaneous frequencies that are not integer multiples of power line voltage frequency.

14. An apparatus in accordance with claim 11 wherein said detector further configured to monitor the detectable signal at a low voltage level at which the signal generator is connected.

15. An apparatus in accordance with claim 14 wherein said signal generator further configured to inject the detectable signal at either a medium voltage collector bus or in a high-voltage transmission system.

16. An apparatus in accordance with claim 11 wherein the generating station is a windfarm and the detectable signal differs from generated transient and harmonic voltages, currents, or both.

17. An apparatus in accordance with claim 16 wherein said detector further configured to monitor the detectable signal at a low voltage level at which a wind turbine of the windfarm is connected.

18. An apparatus in accordance with claim 16 wherein said detector further comprises at least one of a capacitive coupler or a voltage transformer electrically coupled to a medium voltage side of a wind turbine step-up transformer.

19. A generating station comprising:
   at least one generating unit electrically coupled to a power grid wherein the at least one generating unit comprises at least one wind turbine;
   a detector responsive to a signal electrically coupled from the power grid to said at least one generating unit, wherein the signal is superimposed onto a power line voltage outside the generating station, and wherein the detector includes at least one of a capacitive coupler and a voltage transformer; and
   a switch responsive to said detector to switch said at least one generating unit from a grid-connected mode of operation to an islanded mode of operation when the signal to which said detector is responsive is determined to be absent.

20. A generating station in accordance with claim 19 wherein a detectable signal differs from generated transient and harmonic voltages, currents, or both and the detectable signal comprises at least two simultaneous frequencies that are not integer multiples of power line voltage frequency.

* * * * *